United States Patent [19]

Timmons et al.

[11] Patent Number: 5,405,426
[45] Date of Patent: Apr. 11, 1995

[54] PROCESSES FOR THE PREPARATION OF SULFUR COATED FERTILIZERS AND PRODUCTS PRODUCED THEREBY

[75] Inventors: Richard J. Timmons; Harvey M. Goertz, both of Marysville, Ohio

[73] Assignee: OMS Investments, Inc., Marysville, Ohio

[21] Appl. No.: 76,447

[22] Filed: Jun. 14, 1993

Related U.S. Application Data

[63] Continuation-in-part of Ser. No. 666,339, Mar. 8, 1991, Pat. No. 5,219,465.

[51] Int. Cl.$^6$ ............ C05C 9/00; C05G 3/10; C05G 5/00
[52] U.S. Cl. .................. 71/28; 71/64.07; 71/64.11; 71/64.13; 71/904
[58] Field of Search .................. 71/28-30, 71/64.07, 64.11, 64.13, 904, 27

[56] References Cited

U.S. PATENT DOCUMENTS

| | | | |
|---|---|---|---|
| 3,903,333 | 9/1975 | Shirley, Jr. et al. | 71/64.11 |
| 3,991,225 | 11/1976 | Bouin | 71/64.07 |
| 4,042,366 | 8/1977 | Fersch et al. | 71/64.11 |

OTHER PUBLICATIONS

B. R. Currell and A. J. Williams, "Thermal Analysis of Elemental Sulpher", Thermochimica Acta, 9 (1974) pp. 255–259.

Ki-Tat Ho, Gary Derdall and J. B. Hyne, "Dependence of Friability on Ageing of Freshly Formed Sulphur and the Effect of Quench Medium Temperature"; Alberta Sulpur Research Ltd. Quarterly Bulletin, vol.XVII, Nos. 3–4, Oct. 1980–Mar. 1981, pp. 15–24.

Ralf Steudel, Sabine Passlack-Stephan and Gabriele Holdt, "Thermal Polymerization and Depolymerization Reactions of 10 Sulfur Allotropes Studied by HPLC and DSC"; Z. anorg. allg. Chem. 515 (1984), pp. 7–42 (no month).

Malcolm Thackray, "Melting Point Intervals of Sulfur Allotropes"; Journal of Chemical and Engineering Data, vol. 15, No. 4, 1970, pp. 495–497 (no month).

B. Meyer, "Preparation and Properties of Sulfur Allotropes"; Elemental Sulfur–Chemistry & Physics, Chap.4, 1965, pp. 71–84 (no month).

Beat Meyer, "The Structures of Elemental Sulfur"; Adv. Inds. Chem. Radiochem., Chap. 18, 1976, pp. 287–317 (no month).

*Primary Examiner*—Ferris Lander
*Attorney, Agent, or Firm*—Jones, Day, Reavis & Pogue

[57] ABSTRACT

Extended residual, controlled release sulfur coated fertilizers having polymeric topcoats applied over a sulfur coating layer are prepared wherein the sulfur coating contains a sufficient amount of a crystalline sulfur allotrope in combination with at least a minimal level of carbon disulfide insoluble amorphous sulfur to maintain the sulfur coating in a pliable, resilient condition at the time at which the polymeric topcoat is applied over the sulfur coating. The presence of such sulfur allotrope is demonstrated by a shoulder endotherm appearing on a differential scanning calorimetry thermogram within a transition temperature range of about 84° C.–97° C.

14 Claims, 7 Drawing Sheets

PROCESSES FOR THE PREPARATION OF SULFUR COATED FERTILIZERS AND PRODUCTS PRODUCED THEREBY

RELATED APPLICATION

This application is a continuation-in-part of U.S. patent application Ser. No. 07/666,339, filed on Mar. 8, 1991, now U.S. Pat. No. 5,219,465, Jun. 15, 1993.

BACKGROUND OF THE INVENTION

1. Field of the Invention

This invention relates to processes for the preparation of extended residual, controlled release sulfur coated fertilizers and to products produced thereby.

2. Description of the Related Art

Controlled or slow release fertilizers of the general type contemplated herein and methods for the production of such fertilizer products are disclosed in copending parent U.S. patent application Ser. No. 07/666,339, filed Mar. 8, 1991. Specifically, the extended residual, controlled release sulfur coated fertilizer products provided in the copending application release their fertilizer core material such as urea from their coatings at a diffusion controlled rate in an essentially linear release pattern over time.

As disclosed in application Ser. No. 07/666,339, sulfur coated fertilizer products are produced by applying appropriate polymer topcoats over fresh primary sulfur coatings which have sufficient amorphous sulfur content at the time the polymeric topcoat is applied thereover to preserve the surface integrity of the coating with essentially no stress induced discontinuities therein. More particularly, products produced with soluble particulate fertilizer cores including granules and prills coated with a primary sulfur coating and subsequently coated, while the sulfur coating is still fresh, with a polymeric topcoat having particular characteristics, have been found to achieve unique nutrient release patterns and agronomic results compared to those exhibited by prior sulfur coated fertilizers even coated with polymeric topcoats.

The nutrient release characteristics provided in the products of the pending application were achieved by diffusion kinetics similar to the release pattern shown by expensive polymer coated fertilizers requiring high coating levels and very precise application equipment and techniques of production. The products described therein are prepared at relatively low cost with substantially reduced polymer coating levels and with comparatively simpler process equipment utilizing simpler production techniques.

Thus, the products disclosed in the copending application possess exceptional functional qualities and the processes for their production have been found to be effective. Nonetheless, it has been a continuing problem to reduce the manufacturing tolerances inherent in the production processes provided therein and yet produce acceptable extended residual, controlled release sulfur coated fertilizers having outer polymer coatings thereover. For example, as previously taught, it has been considered essential to employ only a fresh sulfur coated fertilizer core as the base layer over which the polymeric layer is applied. That is, in order to prevent excessive embrittlement or cracking of the sulfur layer which would adversely impact the release characteristics of the end product to the extent that the resulting product would be unacceptable for use, it has been believed to be necessary for the fresh sulfur layer to contain a content of carbon disulfide insoluble amorphous sulfur above a critical lower limit at the time at which the polymer coating is applied thereover. This processing limitation regarding use of fresh sulfur having the requisite amorphous sulfur content has placed time constraints on the manufacturing process that producers would prefer to avoid under certain circumstances such as are encountered in batch processing manufacturing facilities in order to enable more efficient process scheduling and more cost effective operations.

SUMMARY OF THE INVENTION

Accordingly, it is a primary object of the present invention to provide processes for producing sulfur coated end products for use as extended residual, controlled release fertilizers which are not dependent on the presence of certain critical levels of amorphous sulfur in the sulfur coatings at the time that polymeric outer coatings are applied thereover.

A further significant object is to provide new controlled or slow release fertilizer products having particulate water-soluble urea cores with primary sulfur coatings thereon and a polymeric topcoat applied thereover which are suitable for use as extended residual, controlled release fertilizers notwithstanding the fact that the primary sulfur coatings have a percentage amorphous sulfur content at the time the polymeric topcoats are applied thereover which normally would be insufficient to prevent embrittlement or cracking of the sulfur layer and, accordingly, would prevent accomplishment of acceptable extended residual, controlled release characteristics in the final product.

We have now found that by modifying previously known methods employed in the production of polymer topcoated sulfur coated fertilizers, the foregoing and other objects of this invention can be accomplished without employing fresh sulfur layers containing significant percentages of amorphous sulfur at the time of applying the outer polymeric coating over the sulfur layer.

In regard to the chemistry of sulfur, it has been known previously that sulfur recently solidified from a melt consists essentially of alpha (orthorhombic), beta (monoclinic) and noncrystalline forms of sulfur, as determined by differential scanning calorimetry (DSC). The noncrystalline forms of sulfur in such recently prepared formulations include all other molecular forms of sulfur such as the amorphous forms of sulfur (predominantly including carbon disulfide insoluble S-MU-Amorphous sulfur) except for long chain polymeric forms which occur only in sulfur that has been recently heated above 160° C.

Also, it has been known that freshly-solidified pure sulfur is predominantly beta with significant amounts of the non-crystalline forms such as amorphous sulfur. The beta form, stable only above 95° C., rapidly converts to alpha (complete in 5 minutes at 60° C. and 2½ hours at room temperature). The non-crystalline sulfur forms in pure sulfur are half converted to alpha in 36 hours. Based on carbon disulfide solubility testing, it has been found that the amorphous sulfur content of sulfur coated urea decreases more rapidly than in pure sulfur. For example, the amorphous sulfur content of a 13% (by weight) sulfur coated urea has been found to decrease quite rapidly so that the amorphous content represents a fraction (normally, less than about 30%) of its initial value by the end of the first day after production. Thus, the aging of these sulfur forms normally results in decreased sulfur durability and increased dissolution rates (reduced controlled release) of for example, sulfur coated fertilizer products having polymer-topcoatings which are produced from such aged sulfur.

The present invention relates to our discovery of a transient crystalline sulfur allotrope which has not been known heretofore (or, at least, has not been observed previously under such conditions). The invention further relates to processes which have been developed for producing sulfur coated fertilizer products having polymeric outer coatings wherein the sulfur coating layer contains a sufficient amount of such new allotropic form of sulfur, at the time the outer polymeric coating is applied thereover to enable the production of novel products exhibiting desirable release patterns even though the quantity of amorphous sulfur in the sulfur coating layer is less than an amount previously considered to be critical. The heretofore unknown sulfur allotrope which is responsible for the success of this process has been found to undergo a phase transition to the beta (monoclinic) form of sulfur at approximately 84°–97° C. as measured by differential scanning calorimetry (DSC) techniques. This compares to alpha or orthorhombic sulfur which undergoes a phase transition to beta or monoclinic sulfur at approximately 100° C.

This transient allotrope has only been observed when sulfur is applied to the surface of a fertilizer substrate such as urea. As employed herein, it is to be understood that the term urea as used herein is meant to encompass combinations, mixtures and blends of urea with other agricultural constituents such as fertilizers, pesticides and the like as well as single entity urea compositions. The allotrope is not produced when solid sulfur only forms from a sulfur melt. Furthermore, the predominance of this newly observed sulfur allotrope does not form immediately from a melt applied to such fertilizer substrate but slowly increases during a time period of about 2 hours to 48 hours after initial formulation of a sulfur coating composition and application of such coating onto a fertilizer substrate. The presence of the new allotrope in the production of solid sulfur coated products is demonstrated by the appearance of a shoulder endotherm measured in watts/gram (W/g) on a thermogram generated by differential scanning calorimetry in the temperature range of about 84° C.–97° C. This new allotrope appears to form at the expense of the carbon disulfide insoluble amorphous sulfur content of the sulfur.

As noted above, the new sulfur allotrope, when present in a sufficient amount, provides resilience to the sulfur even after carbon disulfide insoluble amorphous sulfur has diminished below a level which has been considered previously to be critical in producing satisfactory controlled release fertilizers. Specifically, with a 13% sulfur coating, we have found that the amount of this new allotrope to be included in the sulfur coated products of this invention can be determined to be an amount sufficient to cause a shoulder endotherm having an area greater than about 0.30 joules/gram (J/g) to appear on a thermogram generated by differential scanning calorimetry techniques by integrating over a phase transition temperature between about 84° C.–97° C. In a preferred embodiment, of this invention, the amount of allotrope in the sulfur should be sufficient to cause formation of a shoulder endotherm having an area in a range of about 0.30–0.60 joules/gram (J/g). In this regard, we have found that products containing such amounts of the new allotropic form of sulfur in combination with at least a minimal level of carbon disulfide insoluble amorphous sulfur do not encounter problems arising from excessive embrittlement or cracking of the sulfur layer even though their carbon disulfide insoluble amorphous sulfur content is below a level which has been believed heretofore to be critical. The resulting products have been found to demonstrate desirable nutrient release patterns providing suitable agronomic affects.

Thus, products of the present invention are prepared by coating a particulate water-soluble fertilizer core with a primary sulfur coating containing at least a critical level of the new crystalline sulfur allotrope in combination with at least a minimal level of carbon disulfide insoluble amorphous sulfur and applying a polymeric topcoat thereover. The polymeric topcoat preferably is formed from a water insoluble polymeric film-forming composition having membrane-like permeability characteristics for optimum controlled release of the fertilizer core.

DETAILED DESCRIPTION

Figure 1:
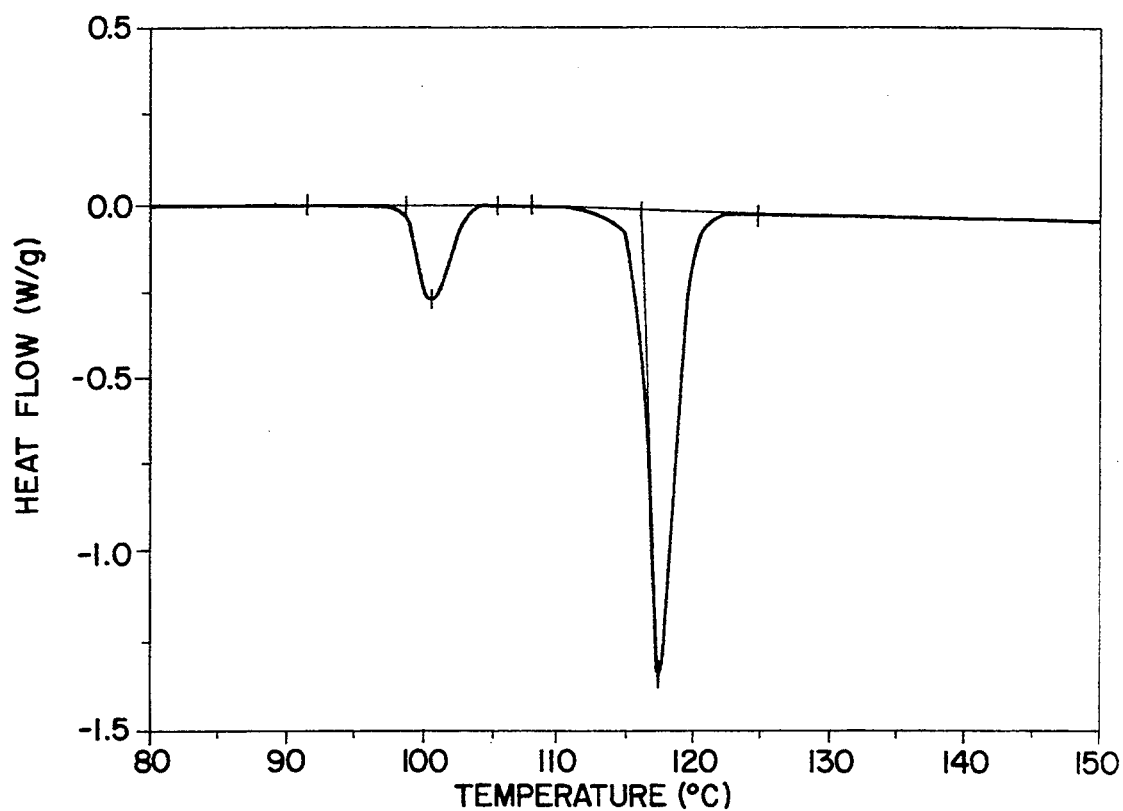
FIG. 1 is a thermogram of a differential calorimetry scan performed over a temperature range of 80° –150° C. on a sample of a 13 percent (by weight) sulfur coating formulation taken about 2 hours after initial preparation of the coating with endotherms representative of transitions in the composition of the sulfur being measured in terms of heat flow on a scale of 0.5 to −1.5 watts/gram (W/g).

While the products of the present invention may be useful for the controlled release of a variety of active constituents, they are primarily useful for the controlled release of fertilizers and accordingly, will be specifically described in connection with a water soluble fertilizer substrate. However, it is to be recognized that the invention also may be applicable to the coating of other water soluble active constituents where prolonged or controlled release is desirable, including pesticides, herbicides, fungicides, growth regulators, insecticides and animal and insect repellents. Such active constituents are well known and examples are set forth in the literature.

It is preferable that the active constituent be in solid, granular or particulate form and it should not decompose or melt at processing temperatures. In addition, the active constituent will normally be moderately to highly water soluble. Thus, a principle object in the use of the coated or encapsulated products of the present invention is to control the leaching of the active constituent therefrom with water.

In general, the process of the present invention includes the steps of coating a fertilizer core with a primary sulfur coating followed by the application of a polymeric topcoat thereover. Contrary to prior processing techniques, we have found that satisfactory extended residual, controlled release fertilizer products can be produced even though the carbon disulfide insoluble amorphous sulfur content of the sulfur coating at the time of application of the polymeric topcoating is below a level which has been considered heretofore to be critical to avoid the adverse impact on coating release characteristics resulting from embrittlement or cracking of the sulfur layer.

In order to achieve this unexpected and novel result, we have found that the primary sulfur coating must contain at least a critical amount of a new crystalline sulfur allotrope in combination with at least a minimal level of carbon disulfide insoluble amorphous sulfur at the time of application of the polymer coating thereover. That is, when this new allotropic form of sulfur is present in the sulfur coating at a sufficient level, the resulting sulfur layer has been found to provide a suitable primary sulfur coating provided that at least a minimal level of carbon disulfide insoluble amorphous sulfur is also present even though the amount of such carbon disulfide insoluble amorphous sulfur is below the level which has previously been considered to be necessary in producing satisfactory slow release sulfur layers.

The new crystalline sulfur allotrope employed herein begins to occur naturally within about 2 hours after initial formulation of a 13% (by weight) sulfur coating and application thereof over a fertilizer core. The presence of this allotrope can be detected by the appearance of a shoulder endotherm on a thermogram generated by differential scanning calorimetry as illustrated in FIGS. 1–12 herein. The quantity of such allotrope present in the composition can be measured as a function of the area encompassed by this shoulder endotherm appearing on the thermogram and is expressed in joules/gram (J/g).

Sulfur coatings containing the requisite content of the new crystalline sulfur allotrope in combination with at least a minimal level of carbon-disulfide insoluble amorphous sulfur do not develop the physical stresses from phase change that generate the defects, surface irregularities and brittleness that is characteristic of prior aged sulfur coated products. It is the lack of these surface irregularities resulting from a brittle sulfur coat that provides a suitable sulfur coated fertilizer substrate for polymer topcoating that will provide satisfactory performance from the combined coatings over the fertilizer core.

The minimal amount of carbon disulfide insoluble amorphous sulfur which must be present in the sulfur layer at the time of application of a polymeric topcoat thereover is greater than about 10% (by weight) of the initial amount of amorphous sulfur present when the sulfur coating composition is freshly prepared.

In regard to the polymeric topcoat applied over the primary sulfur coating, it may be applied as a liquid (emulsion, solution or melt) or may be reacted in situ depending on the type polymer employed. However, it is preferred to employ a polymer which may be applied in a molten state. In the event that the polymeric topcoat is applied in molten condition, it should be applied under low shear conditions in order to optimize the desired end product.

Polymers suitable for use in the polymeric topcoats of the present invention are selected from polymers having sufficient structural integrity to withstand environmental conditions for a period of at least six weeks and, preferably, exhibit membrane-like permeability characteristics which may allow the fertilizer core to release through the polymer film at a diffusion controlled rate.

More specifically, suitable polymer topcoats for use herein should possess certain physical properties. First, the polymer coating should have environmental stability during the period of fertilization and should withstand temperature extremes. It, therefore, should have a melting point above about 120° F. and preferably above 140° F. Additionally, the polymer should be insoluble in water. The polymer should also have good vapor barrier characteristics and, in particular, exhibit low permeability to water vapor.

Permeability to water vapor is calculated in accordance with the following formula:

$$P = \frac{(V)(T)}{(A)(t)(p)}$$

wherein the units describe the volume (V) of gas (water vapor) expressed in $cm^3$ at standard temperature and pressure (STP) permeating a thickness (T) expressed in cm of film per unit area (A) expressed in $cm^2$, per unit time (t) expressed in seconds and at a given concentration gradient or pressure drop of water vapor (p) expressed in cm Hg across the film.

Thus, in accordance with the foregoing, it has been determined that a suitable polymeric topcoat for the fertilizers of this invention should be formed from a polymer having a water vapor permeability ($P \times 10^{10}$) preferably of about 0.1–1000 and, more preferably, about 0.3–500.

Polymers having suitable permeability for use herein include polyvinyl chloride, polyvinylidene chloride, polyethylene, polypropylene, polyethylene terephthalate, polyurethane, polyamides, copolymers of dicyclopentadiene and linseed oil, copolymers of ethylene and ethylacrylates or acrylic acid, copolymer blends of predominantly vinylidene chloride monomers and ethylenically unsaturated comonomers and mixtures thereof. Furthermore, the polymer coatings described in commonly assigned, co-pending U.S. patent application Ser. No. 07/655,157, filed Feb. 14, 1991, entitled "Abrasion Resistant Coatings for Fertilizers" and in commonly assigned, U.S. Pat. No. 5,089,041, entitled "Encapsulated Slow Release Fertilizers," the disclosures of which are incorporated herein by reference, are particularly suited for use herein.

In a preferred embodiment of the present invention, the process includes transferring a sulfur coated fertilizer to a polymer coating drum such as a two-stage drum designed for polymer application and preliminary product cooling. The process employed for applying the primary sulfur coating to the fertilizer core is not critical and may comprise any standard technique. However, notwithstanding the particular process employed to apply the sulfur coating, it is essential that the sulfur coating contains, at the time of application of the polymer coating thereover, at least a critical amount of the crystalline sulfur allotrope.

An example of a process for applying the sulfur may be the TVA process. That is, granular fertilizer, typically urea, is metered into the process by a gravimetric feeder. The urea is heated via hot air to a temperature of 120°–190° F. (155°–175° F. preferred). This is accomplished in a fluid bed heater although the urea can also be heated in other types of heat transfer equipment, such as rotating drums, heated screw conveyors and the like.

The preheated urea is transferred continuously to a rotating drum for sulfur application. Molten sulfur (temperature 280°–310° F.) is pumped to the sulfur coating drum where it is applied to the rotating bed of urea through a number of hydraulic spray nozzles. Spray nozzles such as Spraying Systems' "Tee Jet 6500017" are typically used for this application although other alternate types of nozzles can be used. The temperature of the sulfur coated urea particles is controlled to 165°–180° F. by sweeping hot air through the drum.

The polymer is preferably applied in the molten state. Because of its viscosity, the polymer must be applied so as to prevent air entrainment which would cause pinholes in the coating, resulting in improper sealing. Care must be taken to avoid subjecting the polymer to high shear which would result in air entrainment. Low rpm agitators are used in the polymer melt tank and low rpm gear pumps are used to transfer the molten polymer to the polymer coating drum. Likewise, the application of the molten polymer to the sulfur coated urea, must be done under low shear conditions. Most preferably, this is done by "dribbling" the polymer onto the rotating bed of sulfur coated urea. Spray nozzles are avoided because of air entrainment which would create pinholes in the coating.

The bed temperature within the coating section of the polymer drum is critical. It must be kept above the solidification temperature of the polymer in order to effectively topcoat the sulfur coated product. If the temperature is too low, the polymer solidifies before it can completely "wrap" the particle. The result is higher than desired nutrient release rates for the product. If the temperature is too high, the polymer stays liquid too long and adheres to the equipment rather than to the sulfur coated product. In the case of an ethylene vinyl acetate/polyethylene (EVA/PE) polymer/wax composite polymeric topcoat, the range of coating temperatures preferably is in the range of 150°–190° F. The most preferred range is 165°–180° F. When coated at the proper temperature, the mixture has a "dough like" consistency. Temperature control in the coating section of the drum is accomplished by blowing heated air into the drum.

The second stage of the polymer coating drum serves to cool the mixture to render it free-flowing. Without proper cooling, the product would not be flowable and would quickly plug chutework and other process equipment. The exit temperature of the cooling section must be below the solidification temperature of the polymer. In the case of an EVA/PE composite polymer topcoat, the product must be cooled to below 135° F. to render it flowable. The rate of cooling affects the durability of the coating. Cooling is accomplished by blowing air through the material as it rotates inside the drum. Rates of cooling can be altered by varying the amount of air and the temperature of the cooling air.

Once out of the polymer drum, the product is subsequently cooled to ambient conditions in a fluid bed cooler. The primary purpose of this operation is to prevent caking of the material during bulk storage. Caking is minimized when the product is cooled to below 100° F. Then, the final process operation is screening to remove any agglomerates which may have been formed during the coating process.

The resulting product is free-flowing, resistant to abrasion and handling, and possesses controlled release agronomic properties which vary with the amounts of sulfur and/or polymer applied.

EXAMPLE

A 50 pound sample of urea coated with a 13% (by weight) sulfur coating layer was removed from a sulfur coating drum and was poured on top of plastic bags laid out on a concrete surface and allowed to cool to ambient temperature over a period of about 15 minutes. A portion of this cooled sulfur coated urea (SCU) sample was subjected to a water wash and subsequent grinding treatment in order to remove the sulfur coating from the SCU. Thereafter, the resulting sulfur coating composition was analyzed at various time intervals after preparation by differential scanning calorimetry (DSC) techniques in order to determine the allotrope populations in the sulfur coating.

The results of this DSC testing of the sulfur coating are shown in FIGS. 1–12 with FIGS. 1, 3, 5, 7, 9 and 11 illustrating the DSC scan for the sulfur coating over a relatively broad range of temperatures (80° C. to 150° C.) and heat flow rates (0.5 to −1.50 W/g). The illustrated data demonstrates the various endotherms exhibited by the sulfur sample throughout this full range. For example, the peak appearing at about 115°–120° C. is a large endotherm representing the conversion of crystalline beta sulfur to liquid (lambda) sulfur At approximately 100° C. a smaller peak can be seen to appear on the thermograms which represents the transition involving the conversion of alpha (orthorhombic) sulfur to beta (monoclinic) sulfur. This peak is smaller than that for the melt transition because this transition is less of an endotherm.

Notably, a heretofore unreported transition can be seen to occur in the illustrated thermograms at temperatures between about 84° C. and about 97° C. beginning after a period of about 2 hours from the time of initial preparation of the tested sulfur formulation (i.e., from the conclusion of the 15 minute period during which the SCU test sample cools to ambient temperature in the present testing). This data demonstrates that the processing of the sulfur coating herein results in the generation of a new transient species of sulfur in addition to the other expected sulfur forms.

In order to more clearly illustrate the occurrence and magnitude of this new sulfur species via its phase transition documentation, FIGS. 2, 4, 6, 8, 10 and 12 are provided which are more detailed representations of the corresponding thermograms in FIGS. 1, 3, 5, 7, 9 and 11, respectively, taken over a more specific range of temperatures (80° C. to 100° C.) and heat flow rates (0.01 to −0.04 W/g).

Figure 2:
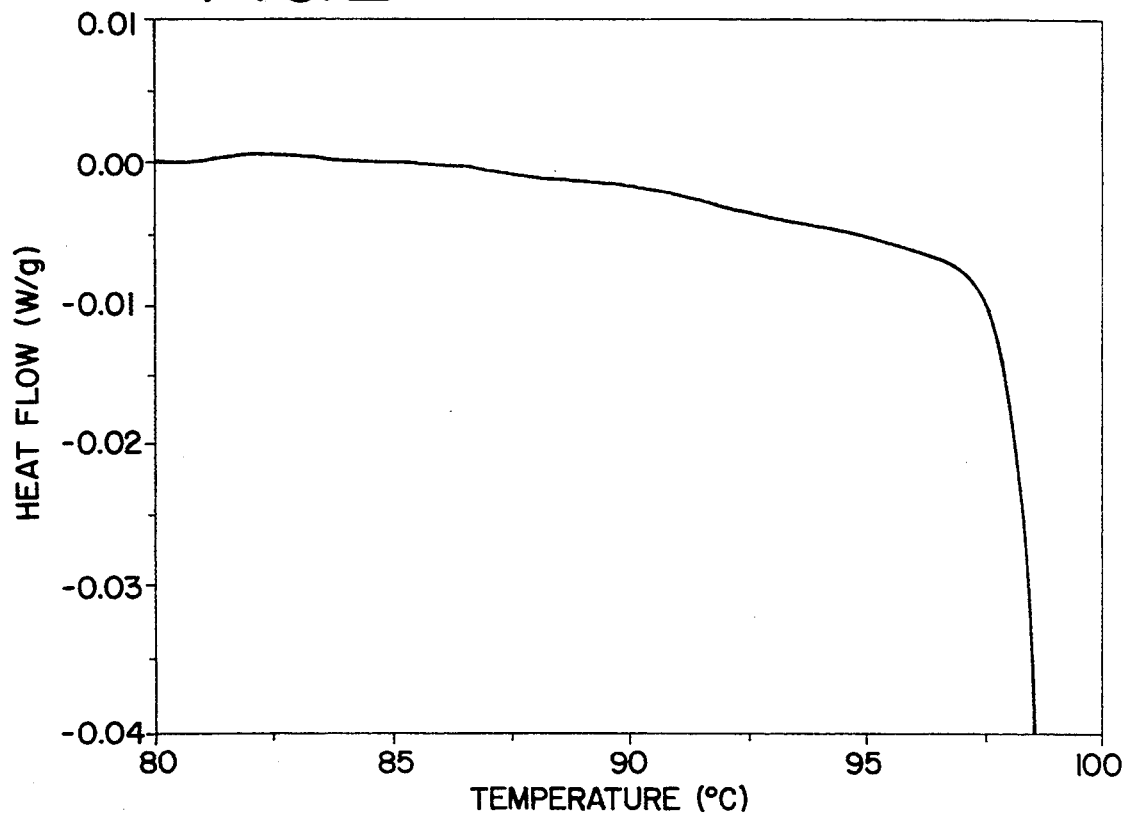
FIG. 2 is the differential calorimetry scanning thermogram of FIG. 1 showing a magnified representation of the endothermic transitions occurring in a temperature range of about 80°–100° C. on a scale of 0.01 to −0.04 W/g.
Figure 3:
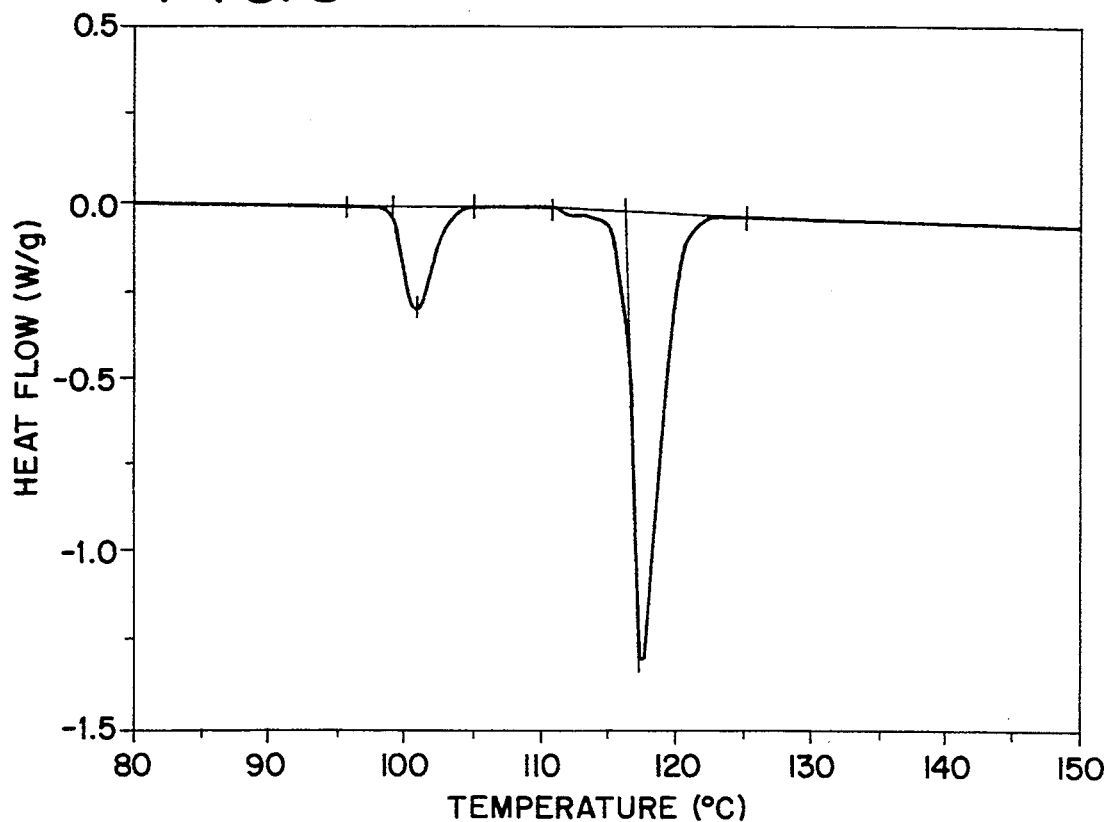
FIG. 3 is a thermogram of a differential calorimetry scan performed over a temperature range of 80°–150° C. on the sample sulfur coating formulation of FIG. 1 taken about 6 hours after initial preparation of the coating with endotherms representative of transitions in the composition of the sulfur being measured in terms of heat flow on a scale of 0.5 to −1.5 W/g.
Figure 4:
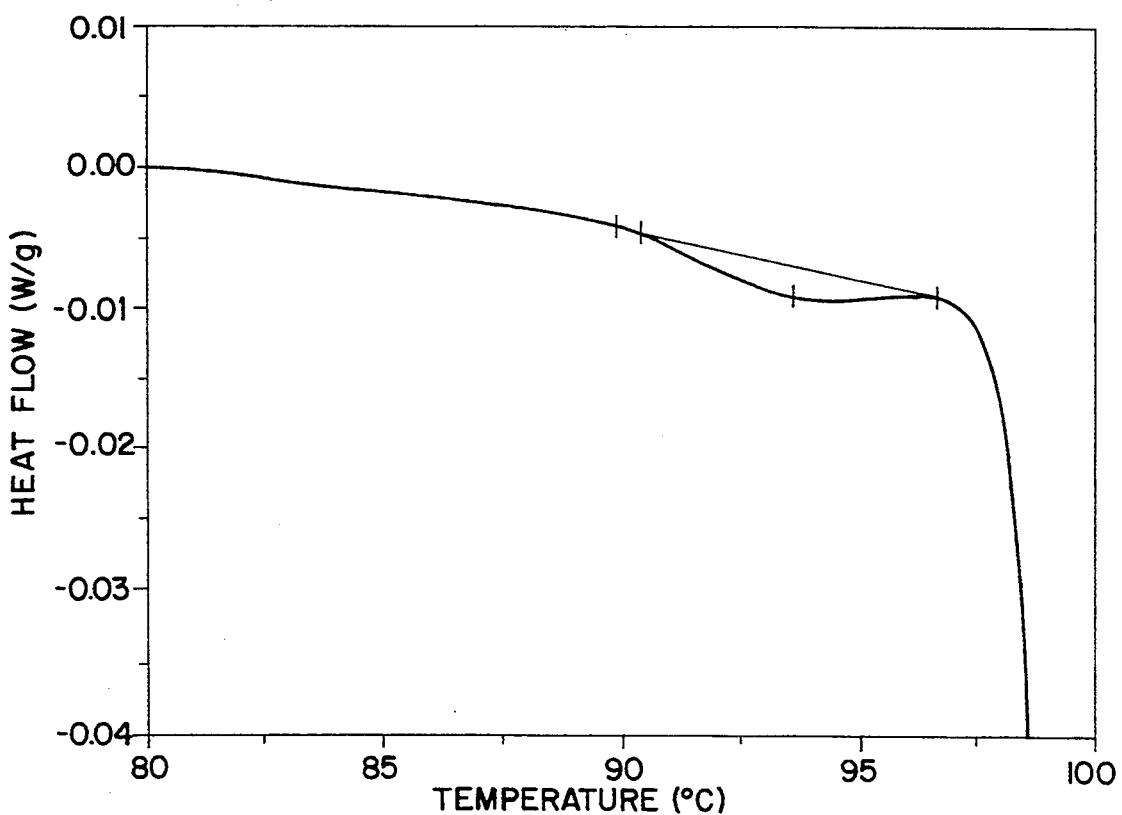
FIG. 4 is the differential calorimetry scanning thermogram of FIG. 3 showing a magnified representation of the endothermic transitions occurring in a temperature range of about 80°–100° C. on a scale of 0.01 to −0.04 W/g.
Figure 5:
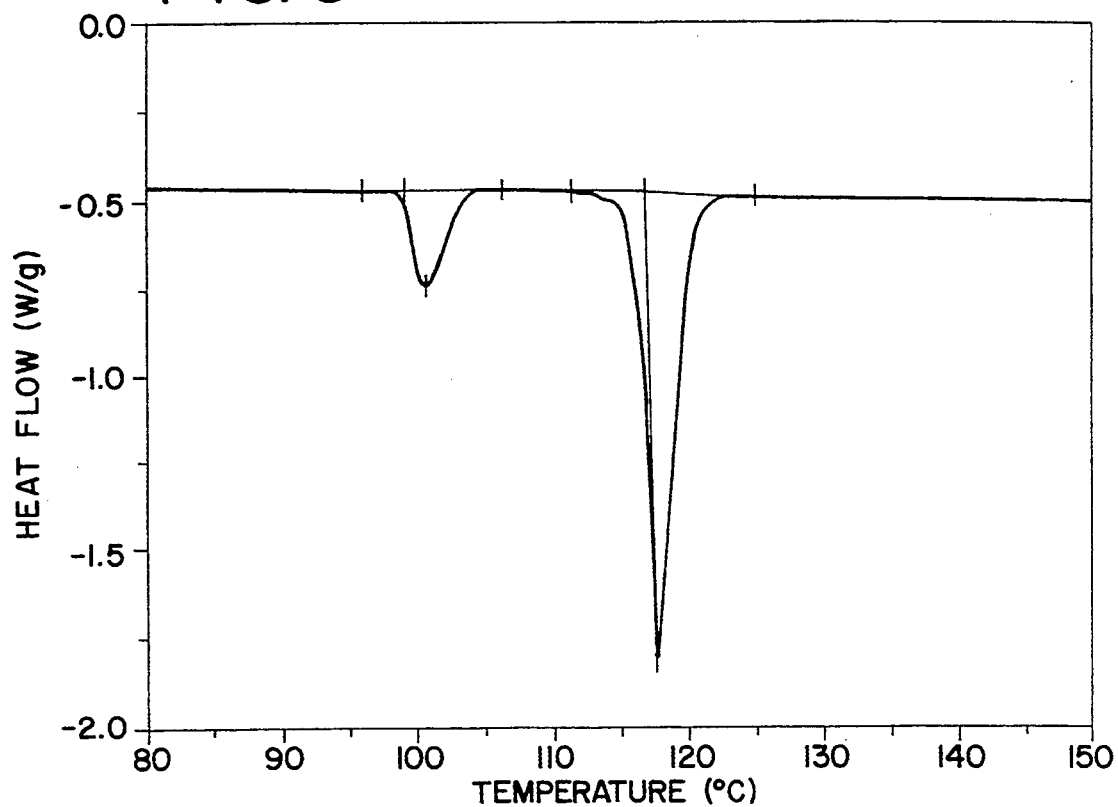
FIG. 5 is a thermogram of a differential calorimetry scan performed over a temperature range of 80°–150° C. on the sample sulfur coating formulation of FIG. 1 taken about 10 hours after initial preparation of the coating with endotherms representative of transitions in the composition of the sulfur being measured in terms of heat flow on a scale of 0.0 to −2.0 W/g.
Figure 6:
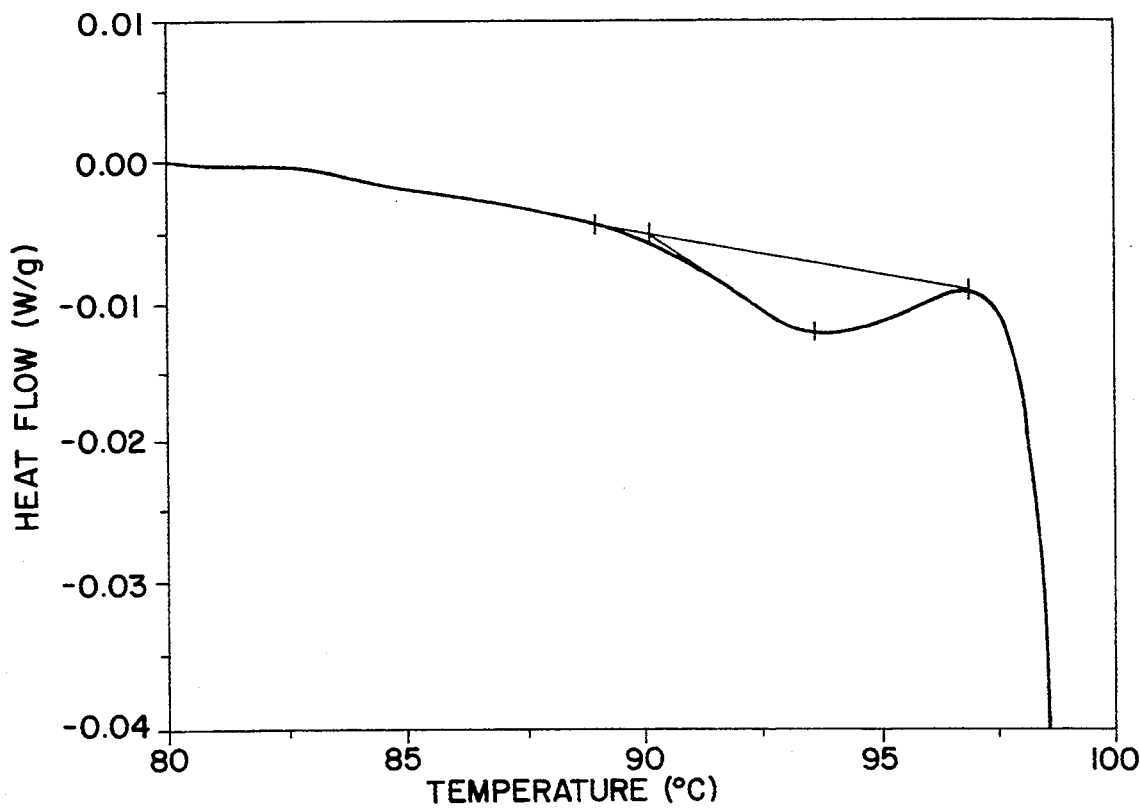
FIG. 6 is the differential calorimetry scanning thermogram of FIG. 5 showing a magnified representation of the endothermic transitions occurring in a temperature range of about 80°–100° C. on a scale of 0.01 to −0.04 W/g.
Figure 7:
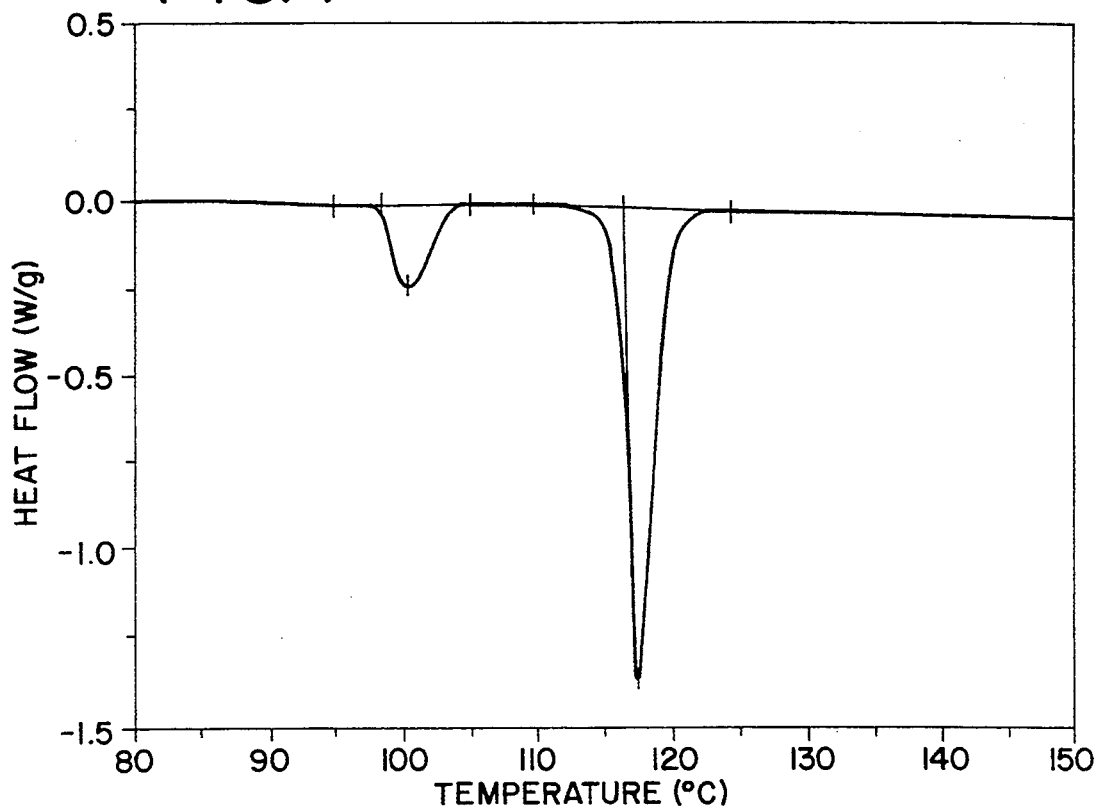
FIG. 7 is a thermogram of a differential calorimetry scan performed over a temperature range of 80°–150° C. on a the sample sulfur coating formulation of FIG. 1 taken about 24 hours after initial preparation of the coating with endotherms representative of transitions in the composition of the sulfur being measured in terms of heat flow on a scale of 0.5 to −1.5 W/g.
Figure 8:
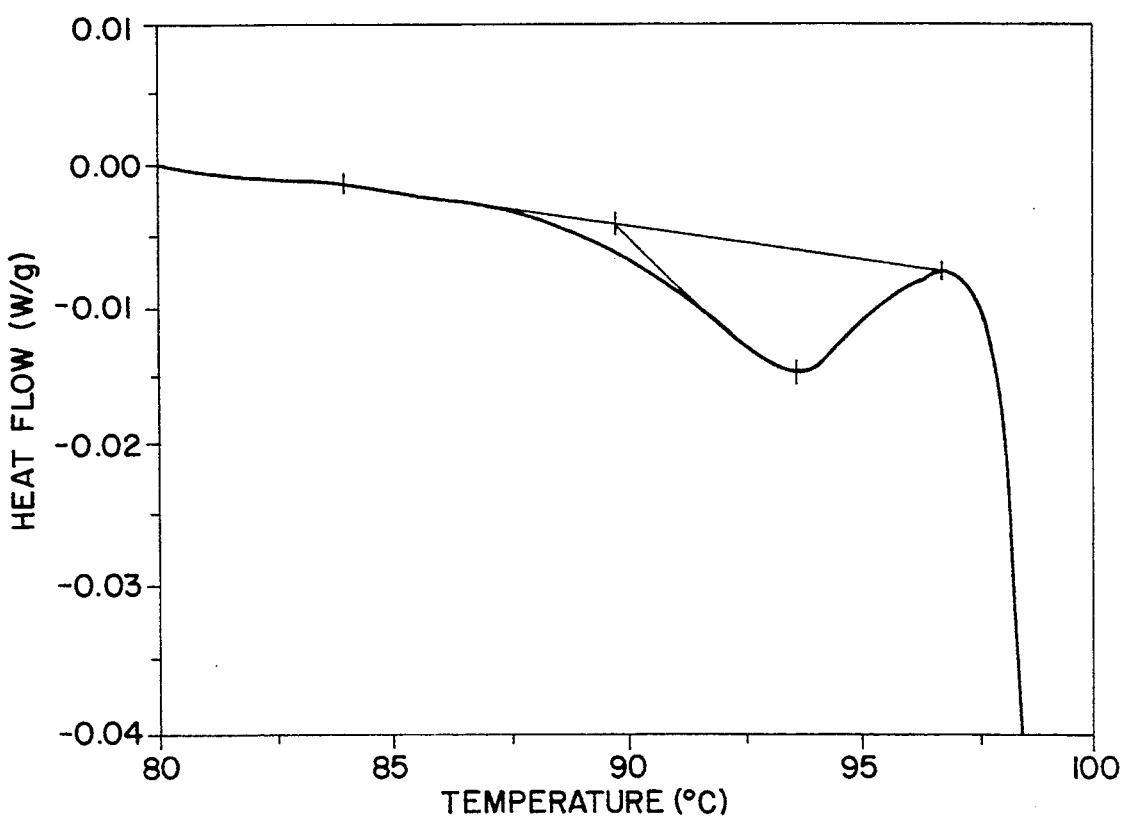
FIG. 8 is the differential calorimetry scanning thermogram of FIG. 7 showing a magnified representation of the endothermic transitions occurring in a temperature range of about 80°–100° C. on a scale of 0.01 to −0.04 W/g.
Figure 9:
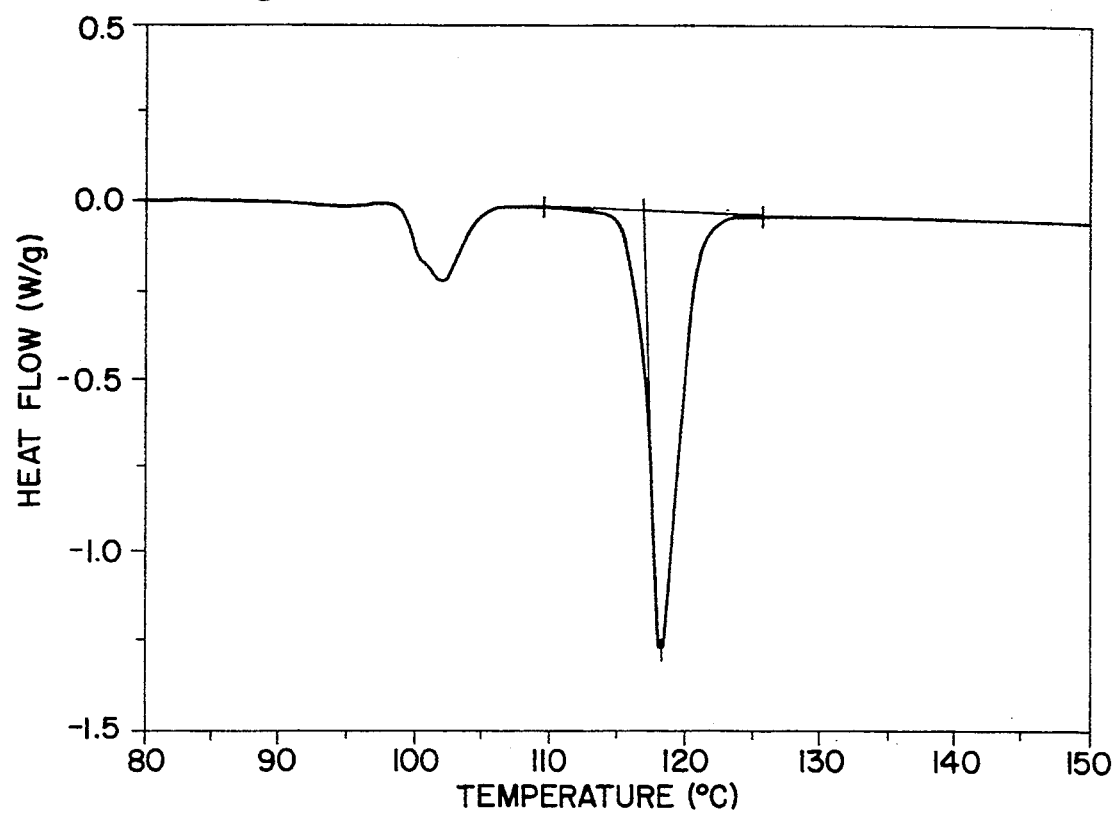
FIG. 9 is a thermogram of a differential calorimetry scan performed over a temperature range of 80°–150° C. on a the sample sulfur coating formulation of FIG. 1 taken about 48 hours after initial preparation of the coating with endotherms representative of transitions in the composition of the sulfur being measured in terms of heat flow on a scale of 0.5 to −1.5 W/g.
Figure 10:
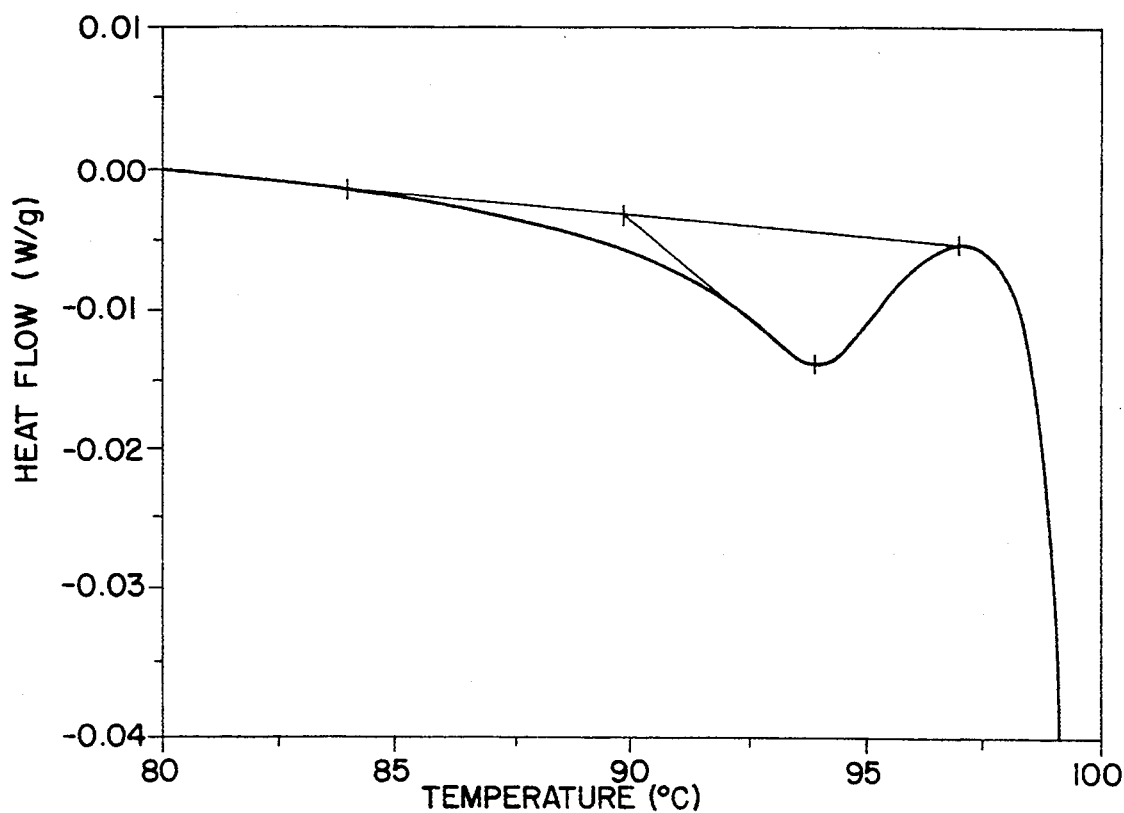
FIG. 10 is the differential calorimetry scanning thermogram of FIG. 9 showing a magnified representation of the endothermic transitions occurring in a temperature range of about 80°–100° C. on a scale of 0.01 to −0.04 W/g.
Figure 11:
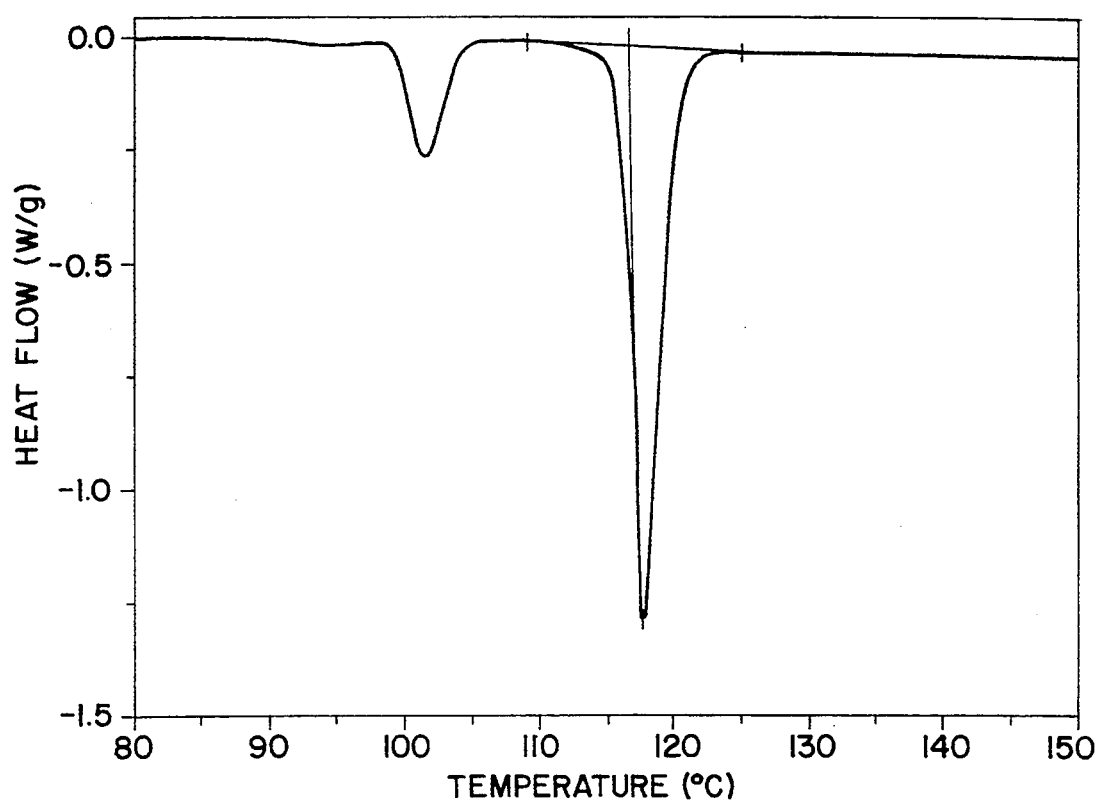
FIG. 11 is a thermogram of a differential calorimetry scan performed over a temperature range of 80°–150° C. on a the sample sulfur coating formulation of FIG. 1 taken about 1 week after initial preparation of the coating with endotherms representative of transitions in the composition of the sulfur being measured in terms of heat flow on a scale of 0.0 to −1.5 W/g.
Figure 12:
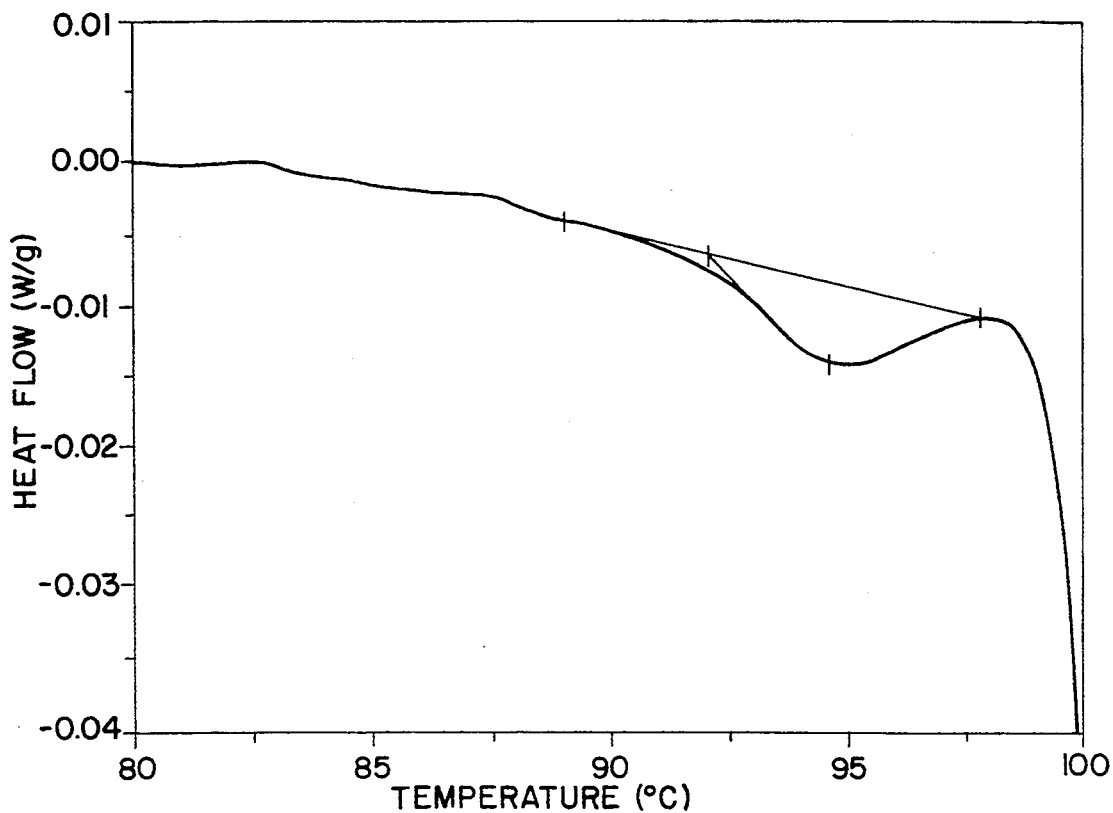
FIG. 12 is the differential calorimetry scanning thermogram of FIG. 11 showing a magnified representation of the endothermic transitions occurring in a temperature range of about 80°–100° C. on a scale of 0.01 to −0.04 W/g.

As best illustrated in FIGS. 1 and 2, it can be seen that even at an aging time of as low as 2 hours there is a barely discernible shoulder endotherm beginning to form between about 84° and 97° C. By 6 hours aging time, as illustrated in FIGS. 3 and 4, this shoulder has evolved into a definite isolated peak which appears to continue to grow in intensity (as demonstrated, for example, by the 10 hour aging time thermograms in FIGS. 5 and 6) through a period of up to about 48 hours or 2 days of aging as illustrated after 24 hours or 1 day in FIGS. 7 and 8 and after 48 hours or 2 days in FIGS. 9 and 10. The endotherm can be seen to have diminished in magnitude thereafter as demonstrated, for example, by the 1 week aging time thermograms in FIGS. 11 and 12. Thus, the illustrated thermograms provide qualitative evidence that the processing of this sulfur coating has resulted in the generation of a new species in the sulfur coating.

Accurate quantitative analysis of these new thermal features is difficult to achieve in view of the fact that the new shoulder endotherm appearing at temperatures of between about 84° and 97° C. overlaps with the larger alpha sulfur to beta sulfur endotherm occurring at about 100° C. Another difficulty in achieving a quantitative analysis of the new allotrope represented by the new endotherm is the unknown characteristics of the new species. Without knowledge of the transition mass or molar enthalpy, it is difficult to judge quantity from the thermal analysis data alone. However, a semi-quantitative approximation of the magnitude of the allotrope content of a sulfur sample can be determined as a function of the area under a DSC endotherm as expressed in Joules per gram (J/g) of total sample. That is, increases or decreases in the area under the endotherm directly correlate with increases or decreases in the quantity of the sulfur species represented by the endotherm.

Thus, in regard to the quantity of the new sulfur allotrope formed herein, Table I summarizes the area in Joules per gram (J/g) under the shoulder endotherms best depicted in FIGS. 2, 4, 6, 8, 10 and 12 which were taken at various time intervals after initial preparation of the test sample as follows:

TABLE 1

| Allotrope Content and Amorphous Sulfur Content of the Test Coating Over Time | | |
|---|---|---|
| Hours After Initial Preparation | Area Under the Endotherm Between 84°–97° C. (J/g) | S-MU-Amorphous Sulfur (% by weight) |
| 0 | 0 | 4.50 (Estimated) |
| 2 | 0 | N.M. |
| 6 | .1174 | N.M. |
| 10 | .2934 | 3.20 |
| 24 | .5431 | 1.32 |
| 48 | .6257 | 0.50 |
| 168 | .2936 | 0.60 |

N.M. — not measured

Figure 13:
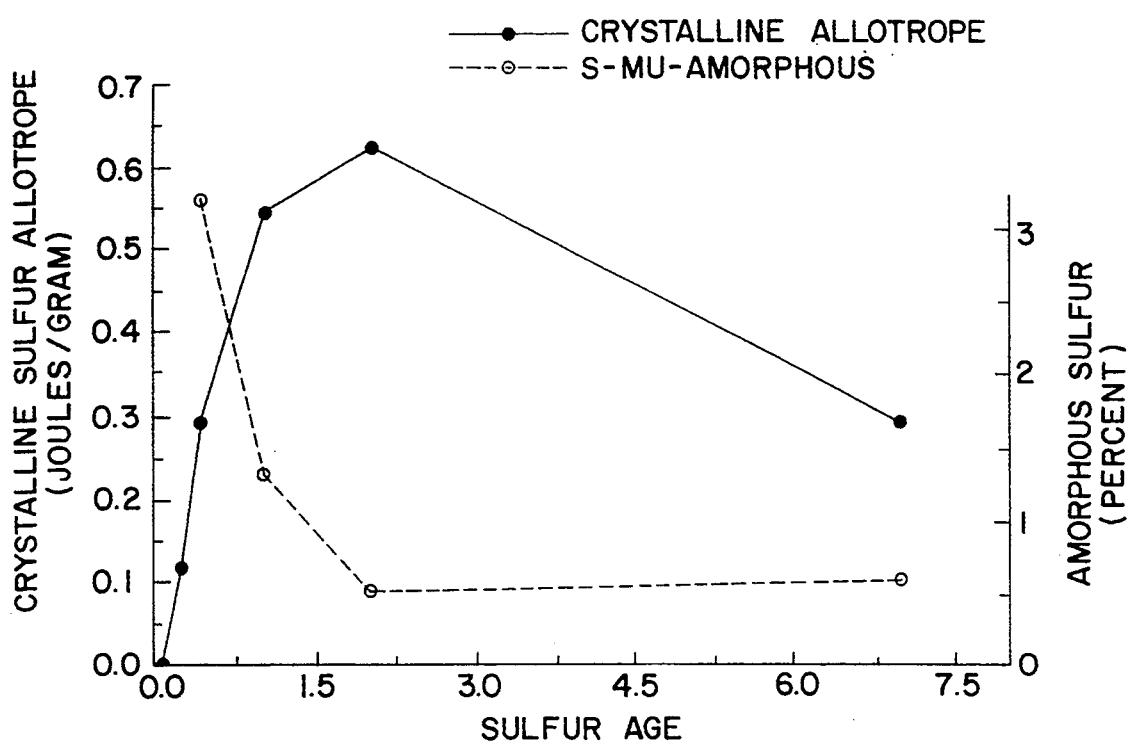
FIG. 13 is a graph of the effect of the age of the sulfur sample employed in formulating a coating on the relative content of the new sulfur allotrope and carbon disulfide insoluble amorphous sulfur in the coating.

Table I also provides a summary of the amorphous sulfur content of the sulfur coating removed from the original 50 pound SCU sample herein as measured over time. This determination of amorphous sulfur content was made by subjecting the removed sulfur coating to carbon disulfide solubility test procedures whereby the amount of carbon disulfide insoluble S-MU Amorphous sulfur was measured on the basis of percent by weight of total coating sample tested. The relative comparison of the allotrope content and amorphous sulfur content of the sulfur coating is further demonstrated by the graph shown in FIG. 13.

Thus, the data set forth in Table 1 demonstrates that during the first 48 hours after initial preparation of the test sample as the amorphous sulfur content decreases below 1%, the content of the new crystalline sulfur allotrope increases. In this regard, it appears that the S-MU-Amorphous sulfur is being converted rapidly to crystalline sulfur and at least in part, to the newly observed crystalline allotrope seen in the DSC scans illustrated herein over a temperature range of about 84°–97° C.

Heretofore, it has been believed that the S-MU-Amorphous sulfur content of the sulfur coating on an SCU product must exceed a critical level (e.g., at least 50% of its original content) in order to provide a suitable substrate onto which a polymer topcoating may be applied to produce an acceptable controlled or slow release fertilizer product. However, as a result of the presence of the unique newly observed allotrope herein, it has been found that the sulfur coating remains resilient and suitable for polymer topcoating even though the amorphous sulfur content has dropped below the level previously considered to be critical. That is, it has now been found that a satisfactory product can be produced even though the amorphous sulfur content of the coating is 50% (by weight) or less as compared with its initial level and provided that the amorphous sulfur content of the sulfur coating at the time that the polymeric outer coating is applied is in excess of about 10% (by weight) of its initial level when the coating is freshly produced.

Figure 14:
FIG. 14 is a graph of the effect of the age of a sulfur sample employed in formulating a coating on the water leaching response of the coating expressed in terms of the 1 hour dissolution rate of the coating.

In order to demonstrate the relative quality of polymer topcoated SCU fertilizers, a series of sample products were prepared by applying a polymer topcoat over various sulfur coatings having the content of transient crystalline sulfur allotrope of this invention and S-MU-Amorphous sulfur as set forth in Table 1. Thereafter, the resulting products were subjected to differential dissolution rate analysis (1 Hour DDR) whereby the moisture barrier properties of the products and, accordingly, their controlled release efficiency was determined. The results of this testing are graphically depicted in FIG. 14 and are tabulated in the following Table 2:

TABLE 2

Quality of Polymer Topcoated SCU Over Time

| Hours After Initial Preparation | Polymer-Topcoated Sulfur Coated Urea 2% Topcoat, 13% Sulfur 1 Hr DDR* |
|---|---|
| 0 | 4 |
| 2 | 4 |
| 6 | 6 |
| 10 | 4 |
| 24 | 4 |
| 48 | 7 |
| 168 (1 week) | 10 |

The results tabulated in Table 2 demonstrate that for SCU containing 13% sulfur, the barrier properties are lost primarily during days 2-7 (48-168 Hrs. after initial preparation), the period when the S-MU-Amorphous sulfur content in the coating has stabilized to its minimum (i.e., below about 10% of its initial level) and the new crystalline allotrope has dropped to a level which generates a shoulder endotherm having an area of less than about 0.30 J/g. However, in an SCU containing 13% sulfur, the initial S-MU-Amorphous sulfur content has been estimated to be about 4.50% and it would have been anticipated previously that the SCU would be unsuitable for polymer topcoating about 10-24 hours after initial preparation when the S-MU-Amorphous content of the sulfur coating has dropped below 50% of the original 4.50% carbon disulfide insoluble amorphous sulfur level. To the contrary, it has been found (and the results tabulated in Table 2 confirm) that as a result of the presence of the new crystalline allotrope of this invention at levels exceeding that required to generate a shoulder endotherm having an area of about 0.30 J/g, the usable period during which the polymer can be applied on SCU having 13% sulfur has been extended up to about 2 days (48 Hours) after initial preparation of the SCU even through the S-MU-Amorphous content has decreased below the level previously considered to be critical.

In summary, the amount of the new allotrope to be included in the fertilizer products herein can be qualitatively determined to be an amount which will cause a shoulder endotherm having an area as depicted in FIGS. 1-12 and quantified in Table 1 to be formed at a phase transition temperature ranging from about 84° to 97° C. As expressed in joules/gram, this area within the shoulder endotherm or peak demonstrated in the thermograms should be greater than about 0.30 and, in a preferred embodiment of this invention, should be in a range of about 0.30-0.60. Furthermore, the amount of amorphous sulfur content in the sulfur coating at the time of application of the polymer coating thereover, is not critical to the production of suitable end products provided that at least a minimal level greater than about 10% (by weight) of its initial content when the coating is freshly produced is present in the sulfur coat at the time of application of a polymer topcoat thereover.

Thus, when an amount of the crystalline sulfur allotrope in excess of an amount which will cause an endotherm having an area of greater than about 0.30 joules/gram to form in a temperature range of about 84°-97° C. is present in the coating, along with a minimal level of amorphous sulfur, it has been found that the resulting polymer coated end fertilizer products provide excellent functional characteristics even though the carbon disulfide insoluble amorphous sulfur content is below previously expected lower limits.

Furthermore, the species of sulfur corresponding to the endotherm at 84°-97° C. has only been observed when sulfur is solidified around a fertilizer substrate such as urea. It is not observed with pure solidified sulfur. Therefore, it is believed that the newly observed allotrope is formed due to an unexpected interaction between the sulfur and the fertilizer substrate, and that this interaction occurs at the interfacial surface of the fertilizer and the sulfur. Consequently, it is believed that the amount of the new transient crystalline allotrope formed herein is a function of coating thickness, since the interfacial volume of sulfur is a greater proportion of the total volume of sulfur for a thinner coating. Also, it is believed that the rate of disappearance of S-MU-Amorphous sulfur and the rate of appearance of the new allotrope will vary with thickness of the sulfur coating and, again, would vary with formulation.

Although the invention has been described in its preferred forms with a certain degree of particularity, it is to be understood that the present disclosure has been made by way of example only. Numerous changes in the details of the compositions and in the operational steps of the processes utilized therein will be apparent without departing from the spirit and scope of the invention, as defined in the appended claims.

We claim:

1. A process for the preparation of an extended residual, controlled release sulfur coated fertilizer product comprising: applying a primary sulfur coating composition on a particulate water-soluble urea core;

allowing a crystalline sulfur allotrope to form in said sulfur coating composition after said coating composition is applied to said urea core, said crystalline sulfur allotrope being present in said coating in a sufficient amount in combination with at least a minimal level of carbon disulfide insoluble amorphous sulfur to maintain the sulfur coating in a pliable, resilient condition, the presence of said sulfur allotrope being demonstrated by a shoulder endotherm appearing on a differential scanning calorimetry thermogram within a transition temperature range of about 84° C.–97° C.; and applying a polymeric topcoat over said primary sulfur coating while said sulfur coating contains said sufficient amount of said allotrope and said at least minimal level of said carbon disulfide insoluble amorphous sulfur.

2. The process of claim 1 wherein said polymeric topcoat is applied over said primary sulfur coating within two days after said primary sulfur coating composition is prepared.

3. The process of claim 1 wherein said crystalline sulfur allotrope is present in said primary sulfur coating in a sufficient amount to result in said shoulder endotherm appearing on said differential scanning calorimetry thermogram having an area of at least about 0.30 J/g.

4. The process of claim 3 wherein said area of said shoulder endotherm appearing on said differential scanning calorimetry thermogram is in a range of about 0.30 J/g to about 0.60 J/g.

5. The process of claim 3 wherein said primary sulfur coating composition contains an initial amount of amorphous sulfur when said coating is freshly prepared and said amorphous sulfur content of said primary sulfur coating is greater than about 10% (by weight) of its initial amount when said polymeric topcoat is applied over said primary sulfur coating composition containing said sufficient amount of said crystalline sulfur allotrope.

6. The process of claim 1 wherein said primary sulfur coating composition contains an initial amount of amorphous sulfur when said coating is freshly prepared and said amorphous sulfur content of said primary sulfur coating is greater than about 10% (by weight) of its initial amount when said polymeric topcoat is applied over said primary sulfur coating composition containing said sufficient amount of said crystalline sulfur allotrope.

7. The process of claim 5 wherein said amorphous sulfur content of said primary sulfur coating is less than about 50% (by weight) of its initial amount when said polymeric topcoat is applied over said primary sulfur coating.

8. An extended residual, controlled release sulfur coated fertilizer product comprising:
   a particulate water-soluble urea core coated with a primary sulfur coating composition; and
   a polymeric topcoat applied over said primary sulfur coating while said sulfur coating contains a sufficient amount of a combination of a crystalline sulfur allotrope and at least a minimal level of carbon disulfide insoluble amorphous sulfur to maintain the sulfur coating in a pliable, resilient condition; the presence of said sulfur allotrope being demonstrated by a shoulder endotherm appearing on a differential scanning calorimetry thermogram within a transition temperature range of about 84° C.-97° C.

9. The product of claim 8 wherein said polymeric topcoat is applied over said primary sulfur coating within two days after said primary sulfur coating composition is prepared.

10. The product of claim 8 wherein said crystalline sulfur allotrope is present in said primary sulfur coating in a sufficient amount to result in said shoulder endotherm appearing on said differential scanning calorimetry thermogram having an area of at least about 0.30 J/g.

11. The product of claim 10 wherein said area of said shoulder endotherm appearing on said differential scanning calorimetry thermogram is in a range of about 0.30 J/g to about 0.60 J/g.

12. The product of claim 10 wherein said primary sulfur coating composition contains an initial amount of amorphous sulfur when said coating is freshly prepared and said amorphous sulfur content of said primary sulfur coating is greater than about 10% (by weight) of its initial amount when said polymeric topcoat is applied over said primary sulfur coating composition containing said sufficient amount of said crystalline sulfur allotrope.

13. The product of claim 8 wherein said primary sulfur coating composition contains an initial amount of amorphous sulfur when said coating is freshly prepared and said amorphous sulfur content of said primary sulfur coating is greater than about 10% (by weight) of its initial amount when said polymeric topcoat is applied over said primary sulfur coating composition containing said sufficient amount of said crystalline sulfur allotrope.

14. The product of claim 13 wherein said amorphous sulfur content of said primary sulfur coating is less than about 50% (by weight) of its initial amount when said polymeric topcoat is applied over said primary sulfur coating.

* * * * *

UNITED STATES PATENT AND TRADEMARK OFFICE
CERTIFICATE OF CORRECTION

PATENT NO. : 5,405,426
DATED : April 11, 1995
INVENTOR(S) : Richard J. Timmons et al.

It is certified that error appears in the above-indentified patent and that said Letters Patent is hereby corrected as shown below:

```
Column  4, Line 13, change "affects" to --effects--.
Column  4, Line 66, after "on" delete "a".
Column  5, Line 10, after "on" delete "a".
Column  5, Line 22, after "on" delete "a".
Column  9, Line 25, after "sulfur" and before "At" insert --.--.
Column 11, Line 31, delete "*" after "DDR".
```

Signed and Sealed this

Twentieth Day of August, 1996

Attest:

BRUCE LEHMAN

Attesting Officer

Commissioner of Patents and Trademarks